Nov. 6, 1934.      J. L. WHEELER      1,979,428
MEASURING FAUCET
Filed Sept. 13, 1933
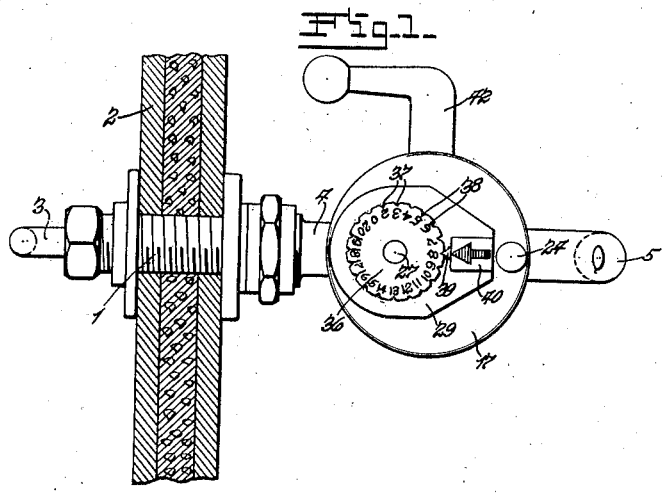
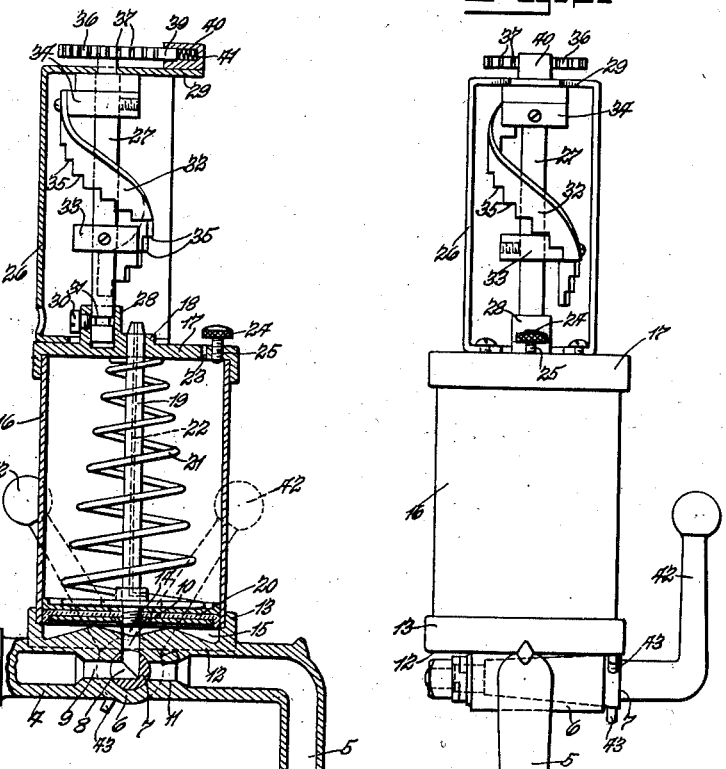
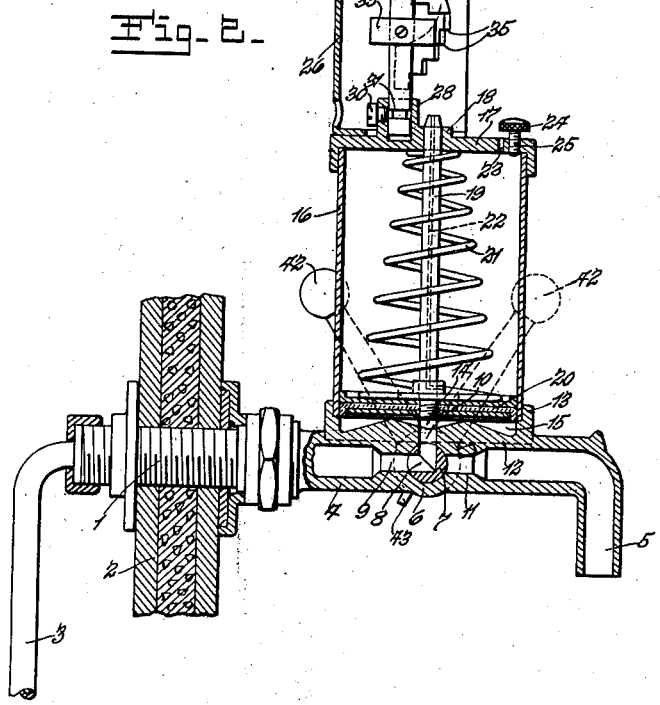
Inventor
John L. Wheeler
by Rippey + Kingsland
His Attorneys Patented Nov. 6, 1934

1,979,428

UNITED STATES PATENT OFFICE 1,979,428

MEASURING FAUCET

John L. Wheeler, St. Louis, Mo.

Application September 13, 1933, Serial No. 689,276

3 Claims. (Cl. 221—103)

This invention relates to measuring faucets for use in drawing measured quantities of fermented beverages, such as beer and other liquids.

An object of the invention is to provide a measuring faucet or tap whereby measured quantities of beer and other fermented liquids and beverages may be drawn or tapped without producing undesired or excessive amounts of foam.

Another object of the invention is to provide an improved measuring faucet or tap having a receptacle into which measured amounts of beer, or other liquids, may be received from the usual keg or barrel containing the beer, or other liquids, in combination with means for selectively controlling the amount of beer, or other liquid, admitted into said receptacle, and a valve controlling the admission of the beer, or other liquid, into said receptacle and the discharge of the same therefrom.

Other objects of the invention will be readily apparent from the following description, reference being made to the annexed drawing, in which—

Fig. 1 is a plan view of my improved measuring faucet or tap.

Fig. 2 is a sectional view of the same.

Fig. 3 is a front elevation.

My invention is attached to a tubular fitting 1 mounted on a support 2 and connected with a pipe or tube 3 leading from the barrel or keg containing the beer, or other liquid, to be discharged in measured quantities.

The faucet or tap comprises a tubular member including a horizontal portion 4 and an outwardly extended portion 5, the horizontal portion of the tap being formed with a valve casing 6. A valve body or plug 7 is mounted in the valve casing 6 for turning movements and has an angular passage 8 therethrough. The valve body or plug 7 may be turned to place the passage 8 in communication with the restricted passage 9 in the part 4 of the tab and with the restricted passage 10 simultaneously; or in communication with the passage 10 and the restricted effluent passage 11 simultaneously.

A circular wall 12 is formed in connection with the part 4 of the tap and said wall is provided with an extended annular flange 13. The outer surface of the wall 12 is formed with a central cavity or depression 14 into which the passage 10 opens and with an annular groove or depression 15.

A cylindrical receptacle 16 has its lower end hermetically mounted within the flange 13. A lid 17 is attached to the outer end of the receptacle 16 and is formed with a central bearing 18.

A rod 19 is mounted for sliding movements in the bearing 18 and has its inner end attached to a piston or wall 20 mounted within the receptacle 16. A spring 21 has its outer end bearing against the end wall 17 of the receptacle and its inner end bearing against the piston or wall 20. An angular port 22 is formed through the rod 19 and opens to the outside at the outer end of said rod and has its inner end opening into the receptacle 16 at the outer side of the piston or wall 20. An air vent 23 is formed through the outer wall 17 of the receptacle and is controlled to an extent by the head 24 of a screw 25. The screw 25 is screwed within a threaded hole in the end wall 17 and the head 24 extends over or across the vent 23. The head 24 constitutes a sort of baffle to restrict or control the admission of air into and the discharge of air from the receptacle and to prevent the air from producing a hissing or other objectionable noise.

A bracket 26 is attached to the wall 17. A shaft 27 has its inner end journaled in a bearing 28 in connection with the end wall 17 of the receptacle and its outer end extending through and supported by the outer end 29 of the bracket 26. A screw retainer 30 is mounted in the bearing 28 and its inner end engages in a groove 31 in the shaft 27 and thereby prevents said shaft from becoming detached from the bearing 28 without interfering with the turning movements of said shaft. A spiral member 32 is attached to collars 33 and 34 secured on the shaft 27 and has a spiral series of shoulders 35 adapted to be placed selectively in alinement with the outer end of the rod 19 in order to limit outward movement of said rod.

A disc 36 is attached to the outer end of the shaft 27 and has a peripheral series of indentations or notches 37 indicated, respectively, by a series of graduations 38. A detent 39 is mounted in a guide 40 on the outer end 29 of the bracket 26 and is actuated by a spring 41 to engage in the notches 37 and thus hold the disc 36 and thereby the shaft 27 in the selected adjustments to which they are turned. The notches 37 and the scale indicia 38 correspond to the abutment shoulders 35, so that there is a visual indication at the outer end of the device having reference to the shoulders 35 and their relation to the end of the rod 19.

The scale indicia 38 may be considered as indicating measured amounts or ounces or the beer, or other liquid, to be withdrawn. When the disc 36 is turned to place any one of the notches 37 in engagement with the detent 39, a corresponding shoulder 35 is placed opposite the outer end of the rod 19. Then, when the valve 7 is turned to the position shown in Fig. 2 in which the passage 8 forms communication from the passage 9 to the passage 10 and thence to the inside of the receptacle, the beer, or other liquid, will be forced through the pipe 3, the fitting 1 and the passages 9, 8 and 10 into the receptacle 16. This liquid entering the receptacle will force the wall 20 outwardly in opposition to the spring 21 until the outer end of the rod 19 engages the cooperating shoulder 35. Air from within the receptacle 16 is forced out through the ports 22 and 23.

Then, when the valve 7 is turned from the position shown in Fig. 2 to position in which the valve passage 8 forms communication from the passage 9 to the passage 11, the liquid will be ejected from the receptacle 16 by the wall or piston 20 operated by the spring 21 and said liquid will be discharged through the downwardly extended part 5 of the tap without the formation of an undue amount of foam on the beer.

By this device equal measured amounts of beer may be discharged or withdrawn into different receptacles, such as glasses or steins, without forming unequal amounts of foam in the respective glasses or steins. This avoids considerable waste and enables the attendant to furnish to each customer exactly the right amount of beer, or other liquid.

The valve is easily operated by a handle 42. The valve may be stopped in its two effective positions by a pin 43 attached thereto and projecting beyond opposite sides thereof to engage the bottom wall 12 of the receptacle.

It must now be clear that my invention obtains all of its intended objects and purposes in a highly efficient and satisfactory manner and that the device can be manufactured and installed at comparatively low cost. The device operates easily and surely because of the formations 14 and 15 which prevent the creation of vacuum at the inner side of the piston or wall 20 and prevent said piston or wall from adhering closely to the wall 12.

The construction, arrangement and formation of the parts may be varied as widely as the scope of equivalent limits will permit and the device may be mounted in other than the vertical position shown without departure from the nature and principle of the invention. I do not restrict myself in any unessential particulars, but what I claim and desire to secure by Letters Patent is:

1. A device of the character described comprising a faucet having a passage therethrough, a receptacle having a passage communicating with said passage through said faucet and arranged to receive and discharge liquid through said last named faucet, a device supported by said faucet and controlling said passages and being settable in one position to admit liquid to said receptacle and settable in another position to discharge liquid from said receptacle, a movable wall in said receptacle limiting the amount of liquid that may enter said receptacle, a rod attached to said wall and extending for sliding movements through one end of said receptacle, a rotary shaft supported out of alinement with said rod, and a spiral series of abutments for limiting extent of movement of said rod supported by said shaft.

2. A device of the character described comprising a faucet having an influent end and an effluent end, a receptacle in communication with said faucet, a valve operative to cause liquid to flow from the influent end of said faucet into said receptacle and also to cause said liquid to flow from said receptacle from the effluent end of said faucet, a movable wall in said receptacle operated in one direction by the liquid entering said receptacle, a rod attached to said wall and extending for sliding movements through and beyond one end of said receptacle, a spiral series of abutments for said rod, and means for supporting said abutments for rotation about an axis disalined from said rod.

3. A device of the character described comprising a faucet having an influent end and an effluent end, a receptacle in communication with said faucet, a valve operative to cause liquid to flow from the influent end of said faucet into said receptacle and also to cause said liquid to flow from said receptacle from the effluent end of said faucet, a movable wall in said receptacle operated in one direction by the liquid entering said receptacle, a rod attached to said wall and extending for sliding movements through and beyond one end of said receptacle, a spiral series of abutments for said rod, means for supporting said abutments for rotation about an axis disalined from said rod, and means wholly within said receptacle for moving said wall toward said faucet.

JOHN L. WHEELER.